United States Patent [19]
Herman et al.

[11] Patent Number: 5,783,637
[45] Date of Patent: Jul. 21, 1998

US005783637A

[54] PLASTIC CONTAINER MADE FORM A FUSION BLEND OF POST CONSUMER PLASTIC AND ETHYLENE POLYMERS

[75] Inventors: James N. Herman; James E. Hiltner, both of Sylvania, Ohio

[73] Assignee: Owens-Illinois Plastic Products Inc., Toledo, Ohio

[21] Appl. No.: 654,438

[22] Filed: May 28, 1996

Related U.S. Application Data

[62] Division of Ser. No. 369,990, Jan. 9, 1995, Pat. No. 5,534,317, which is a continuation of Ser. No. 842,838, Feb. 27, 1992, abandoned.

[51] Int. Cl.$^6$ .................................................. C08L 23/06
[52] U.S. Cl. ........................ 525/240; 264/454; 215/44; 428/35.7
[58] Field of Search .................... 428/35.7, 36.92, 428/542.8, 903.3; 264/37, 454; 215/44; 206/524.1, 524.6; 525/240

[56] References Cited

U.S. PATENT DOCUMENTS

| | | |
|---|---|---|
| 3,261,889 | 7/1966 | van't Wout . |
| 3,280,220 | 10/1966 | Nelson . |
| 3,795,633 | 3/1974 | Golovoy et al. . |
| 3,884,855 | 5/1975 | Baumann et al. . |
| 3,976,612 | 8/1976 | Kaji et al. . |
| 4,115,499 | 9/1978 | Salyer et al. . |
| 4,250,222 | 2/1981 | Mavel et al. . |
| 4,332,748 | 6/1982 | Fremont . |
| 4,390,666 | 6/1983 | Moriguchi et al. . |
| 4,495,334 | 1/1985 | Matsuura et al. . |
| 4,547,551 | 10/1985 | Bailey et al. . |
| 4,550,143 | 10/1985 | Tanaka et al. . |
| 4,567,069 | 1/1986 | Jabarin ............... 206/524.3 |
| 4,577,768 | 3/1986 | Go .......................... 215/1 C |
| 4,737,547 | 4/1988 | White ..................... 525/193 |
| 4,786,688 | 11/1988 | Thiersault et al. ...... 525/240 |
| 4,808,482 | 2/1989 | Benge . |
| 4,990,382 | 2/1991 | Weissenstein . |
| 5,028,663 | 7/1991 | Chung ................... 525/198 |
| 5,030,662 | 7/1991 | Banerjie ............... 521/43.5 |
| 5,073,416 | 12/1991 | Avakian et al. ........... 428/2 |
| 5,073,598 | 12/1991 | Anzini . |

FOREIGN PATENT DOCUMENTS

WO9119763  12/1991  WIPO .

*Primary Examiner*—Charles Nold

[57] ABSTRACT

A plastic container made from a fusion blend of a post consumer plastic and ethylene polymers and comprising post consumer resin of homopolymer high density polyethylene resin and a small amount of linear low density polyethylene resin. In another form, the container is made from a blend of post consumer homopolymer high density polyethylene resin, virgin high density polyethylene resin with a small amount of linear low density polyethylene resin. The physical properties of the container including stress crack resistance are maintained as contrasted to the loss of such physical properties that have been heretofore resulted from the use of post consumer resins.

5 Claims, No Drawings

PLASTIC CONTAINER MADE FORM A FUSION BLEND OF POST CONSUMER PLASTIC AND ETHYLENE POLYMERS

This application is a division of Ser. No. 08/369,990, filed Jan. 9, 1995, now U.S. Pat. No. 5,534,317, which is a continuation of Ser. No. 07/842,838, filed Feb. 2, 1992, abandoned.

This invention relates to plastic containers and particularly to plastic containers made of post consumer resin.

BACKGROUND AND SUMMARY OF THE INVENTION

In the use of plastic materials for containers such as bottles, it has been found desirable to attempt to recycle and reuse the plastic which is commonly known as post consumer plastic (PCP) or post consumer resin (PCR). In attempts to make containers from such materials, it has been found that the properties have been adversely affected.

Specifically when containers are made from post consumer high density polyethylene (HDPE) container scrap, it has been found that the containers have diminished physical properties and particularly diminished distance to stress cracking. Such containers also have been used for packaging of certain types of liquid detergent products. The use of such containers to package liquid detergent products has been somewhat restricted, however, by reason of the fact that many types of liquid detergent products accelerate the tendency of the container to exhibit stress cracking. Stress cracking is evidenced by the appearance of hazy cracks in the container which are aesthetically unpleasing to the ultimate consumer. In extreme cases, stress cracking can lead to leakage of the contents from the container. Stress cracking can occur when the containers are for liquid products including liquid detergents and liquid hypochlorite bleaches.

It has been suggested that such post consumer resin be utilized because large quantities of high density polyethylene post consumer resin are available due to the extensive use of high density polyethylene in large containers for milk and water. Post consumer resin from such containers contain contaminants of paper and other plastic resins, for example, from closures such that it has been generally thought that it can not be used to make satisfactory plastic containers.

Accordingly among objectives of the present invention are to provide a blend of post consumer resin from high density polyethylene containers and the like which will have substantially resistance to stress cracking and which will have minimal diminution in other physical properties permitting its use for various kinds of containers, that are used for containing various products.

In accordance with the invention, plastic containers are made from a fusion blend of a post consumer resin and a small amount of linear low density polyethylene resin. In another form, containers are made from a blend of post consumer homopolymer high density polyethylene resin, virgin high density polyethylene copolymer resin with a small amount of linear low density polyethylene resin. The physical properties of the container including stress crack resistance are maintained as contrasted to the loss of such physical properties that have been heretofore resulted from the use of post consumer resins.

In accordance with the invention, pellets or flakes of a homopolymer high density polyethylene resin from post consumer resin (PCR) and pellets of linear low density polyethylene were mixed and fusion blended. The containers were blow molded and subjected to testing for stress cracking, top load and drop impact.

In another form the blend included virgin high density copolymer resin.

The blends contain about 10–95% by weight of post consumer resin, 0–75% by weight of virgin high density polyethylene copolymer and 2.5–25% by weight of linear low density polyethylene resin.

Post consumer resin as used herein contains primarily the plastic from high density polyethylene homopolymer containers used for packaging milk, small amounts of colored plastic containers and possible polypropylene resin from syrup bottles, multi-layer ketchup bottles and caps. Such post consumer resin has the properties set forth in the following Table I.

TABLE I

| PROPERTY | SPECIFIED VALUE |
| --- | --- |
| Material Density | .961 ± .002 natural |
| Melt Flow - Melt Index | 0.75 ± 0.2 dgm |
| Polypropylene (Includes Multi-layer Bottles) | Not to exceed 3% |
| Fines | <0.01% |
| Moisture | <0.01% |
| Contamination | |
| Paper | <0.01% |
| Plastic-Dens. >1.0 gm/cc | <0.1% |
| Metal fragments | None |
| Other (glass, stone) | None |

The virgin high density homopolymer resin contains linear high-density ethylene polymer. Each of the linear high-density ethylene copolymer included in the blends will have a density of at least about 0.94 gm/ml, a melt index of less than about 0.5 gm/10 min. and will have polymerized therein at least about 98 mol % ethylene with any comonomer polymerized therein being an alpha-monoolefin in containing about 3 to 12 carbon atoms. Such linear high-density ethylene polymers are known and reported in the art and are commercially available from numerous commercial producers. Such linear high-density ethylene polymers are prepared by polymerizing ethylene, optionally in the presence of an alpha-monoolefin comonomer containing 4 to 12 carbon atoms in the presence of certain metallic catalysts such as chromium catalysts, e.g. $CrO_3$ supported on silica-alumina supports, and the Ziegler-Natta catalysts, e.g. $TiCl_3$ employed in conjunction with certain aluminum alkyl cocatalysts. The requisite density and melt index desired in the polymer are obtained by proper control of polymerization conditions including temperature, pressure, comonomer concentration, and the concentration of terminating agents such as hydrogen. The preferred linear high-density ethylene polymers will have a density of at least about 0.94 gm/ml. The especially preferred polymers will have a density of at least about 0.95 gm/ml.

Stress crack resistance is conventionally conducted with test methods as established by Technical Bulletin PBI 11-1978 of the Plastic Bottle Institute, Rev.1-1991 or ASTM D2561-70 (Reapproved 1989).

The linear low-density ethylene polymer(s) included in the blends of the invention have a density in a range of about 0.91 to about 0.93 gm/ml, preferably in a range of about 0.92 to about 0.93 gm/ml, and especially about 0.925 gm/ml. The linear, low-density ethylene polymers will have a melt index of less than about 2.0 and preferably less than about 1.0 gm/10 min. It is desirable for the melt index to be close to the melt index of the linear high-density ethylene polymer included in the blend. These polymers are ethylene copolymers having polymerized about 2–6 and preferably about 4–6 mol % of an alpha-monoolefin containing 3 to 12 carbon atoms with the balance of the monomer polymerized therein being ethylene. The linear low-density ethylene polymers employed in the present invention have long linear chains with controlled numbers of relatively short chain branches attached to the linear chain along its entire length. These sides chains or "branches" are short and will contain from about 1 to 10 carbon atoms depending upon the particular alpha-monoolefin employed in the preparation of the polymer. The linear low-density ethylene polymers differ structurally from low-density ethylene polymers made by high-pressure free radical initiated polymerizations in having few, if any, long chain branches.

somewhat modified catalysts will be employed. One of the techniques to prepare such polymers involves copolymerizing ethylene and butene 1 in the vapor phase in a fluidized bed process. By reason of the constraints imposed by carrying out the polymerization in the vapor phase, the ethylene polymers prepared by this process are limited to copolymers of ethylene and butene 1. By operating in solvent systems, copolymers can be prepared from alpha-monoolefin comonomers containing up to 12 carbon atoms. The preferred linear low-density ethylene polymers for inclusion in the blends of the invention will be ethylene copolymers having polymerized therein at least one alpha-monoolefin comonomer containing 6 to 12 carbon atoms, and which optionally also will have copolymerized therein butene 1.

The following Table II summarizes one set of tests that have been conducted.

32 OZ. PINCH WAIST OVAL

| Run # | 1 | 2 | 3 | 4 | 5 | 6 | 7 | 8 | 9 | 10 | 11 | 12 | 13 |
|---|---|---|---|---|---|---|---|---|---|---|---|---|---|
| % PCR | 25 | 25 | 25 | 25 | 50 | 50 | 50 | 75 | 75 | 75 | 90 | 95 | 10 |
| % Virgin COP. | 72.5 | 70 | 65 | 50 | 47.5 | 45 | 40 | 22.5 | 20 | 15 | | | |
| % LLDPE | 2.5 | 5 | 10 | 25 | 2.5 | 5 | 10 | 2.5 | 5 | 10 | 10 | 5 | |
| Gram Weights (20 Bottles) | | | | | | | | | | | | | |
| Mean | 46.37 | 46.51 | 46.77 | 46.91 | 46.63 | 46.86 | 46.94 | 46.46 | 46.64 | 46.34 | 47.78 | 46.77 | 46.53 |
| STD. Dev. | .387 | .350 | .435 | .251 | .211 | .181 | .229 | .177 | .246 | .252 | .207 | .194 | .228 |
| Top Load (10 Bottles) | | | | | | | | | | | | | |
| Pounds | 36.1# | 35.0# | 38.5# | 39.6# | 42.1# | 39.6# | 43.4# | 45.5# | 42.8# | 44.1# | 42.0# | 44.9# | 45.8# |
| Drop Test (25 Bottles) Bruceton | | | | | | | | | | | | | |
| EMFH | 6.9' | 6.75' | 9.5'+ | 9.25' | 8.75' | 8.3' | 9.15' | 9.5'+ | 9.25' | 9.25' | 9.25' | 7.58' | 8.13' |
| ESCR 140 Degrees (10 Bottles) | | | | | | | | | | | | | |
| Days to 1st Fail | 25 | 6 | 30 | 35 | 6 | 2 | 5 | 2 | 2 | 3 | 3 | 2 | 1 |
| Days to 50% Fail | 33 | | 37 | | 10 | 7 | 15 | 2 | 3 | 7 | 4 | 3 | 1 |
| ESCR 120 Degrees (10 Bottles) | | | | | | | | | | | | | |
| Days to 1st Fail | 2 | 4 | 3 | 6 | 3 | 3 | 4 | 2 | 2 | 3 | 2 | 2 | 1 |
| Days to 50% Fail | 5 | 11 | 9 | 7 | 4 | 4 | 6 | 2 | 2 | 4 | 3 | 2 | 1 |

**Variable #4 and #6 bottles have been in 140 degree stress crack test for 51 days as of 2/7/92. 50% failure has yet to occur.

The linear low-density ethylene polymers are commercially available from multiple commercial sources. Such polymers are prepared by copolymerizing ethylene with an alpha-monoolefin in containing about 3 to 12 carbon atoms in the presence of certain metallic catalysts of the same general type employed to prepare the linear high-density ethylene polymers discussed supra. The polymerization conditions employed in their preparation differ somewhat, and In another series of test blends of linear low density polyethylene (LLDPE) combined with post consumer high density polyethylene (HDPE) bottle scrap (PCR) and virgin HDPE polymer. The linear low density polymer was in a fusion blend with a pigment as a carrier of 50% linear low density polymer and 50% pigment. Bottles were subsequently tested along with control bottles made without incorporating LLDPE resin as shown in the following Table III:

TABLE III

| Composition | ESCR, F50, Days 120 Deg. 140 Deg. W/TP LD. | | Top Load LBS. | Drop Impact EMFH | |
|---|---|---|---|---|---|
| 1st Bottle Design - 32 Ounce Detergent | | | | | |
| Control, 100% HDPE Copolymer | 26 | 63 | 42.5 LBS. | 8' | 11" |
| 25% PCR, 75% HDPE Copolymer | 18 | 56 | 36.6 LBS. | 9' | 2" |
| 25% PCR, 72.5% HDPE Copolymer Plus 2.5% LLDPE | 16 | 82 | 41.7 LBS. | 6' | 3" |
| 50% PCR, 50% HDPE Copolymer | 8* | 51 | 40.2 LBS. | 7' | 0" |
| 50% PCR, 45% HDPE Copolymer | 16 | 50 | 42.6 LBS. | 6' | 7" |

TABLE III-continued

| Composition | ESCR, F50, Days 120 Deg. 140 Deg. W/TP LD. | Top Load LBS. | Drop Impact EMFH | |
|---|---|---|---|---|
| Plus 5% LLDPE | | | | |
| *Did Not Meet Specifications For ESCR. | | | | |
| 2nd Bottle Design - 64 Ounce Detergent, With Handle | | | | |
| Control, 96% HDPE Copolymer, 4% Colorant | 41 Days, PROD. "A" | | | |
| 50% PCR, 41% HDPE Copolymer, 4% Colorant Plus 5% LLDPE | 27 Days, PROD. "A" 140 Deg. PROD. "B" >7 Days. | | | |
| 3rd Bottle Design - 128 Ounce, With Handle | | | | |
| Control, 96% HDPE Copolymer, 4% Colorant | 140 Deg, >19 Days | 87.9 LBS. | 4' | 5" |
| 50% PCR, 41% HDPE Copolymer, 4% Colorant Plus 5% LLDPE | 140 Deg, >19 Days | 89.4 LBS. | 3' | 10" |
| (50% PCR, 46$ HDPE Copolymer 4% Colorant) | 140 Deg, >19 Days | 80.3 LBS. | 3' | 9" |

It can be seen that improved results were obtained when the linear low density polyethylene was preblended with pigment.

We claim:

1. In the method of making a hollow plastic container by forming a hollow plastic parison and blow molding the parison wherein the plastic comprises post consumer plastic of homopolymer high density polyethylene plastic and a small amount of linear low density polyethylene resin, virgin high density polyethylene copolymer resin in said fusion blend, said virgin high density polyethylene copolymer resin having a density of at least about 0.94 gm/ml, a melt index of less than about 0.5 gm/10 min. and will have polymerized therein at least about 98 mole % ethylene with any comonomer polymerized therein being an alpha-monoolefin containing about 3-12 carbon atoms, said post consumer resin having a density of about 0.961 and a melt index of about 0.75, said linear low density polyethylene having a density in the range of about 0.91 to about 0.93 gm/ml, and a melt index of less than about 2.0 and having polymerized about 2-6 mole % of an alpha-monoolefin containing 3-12 carbon atoms with the balance of the monoolefin polymerized therein being ethylene, said post consumer resin ranging between about 25-95% by weight, said linear low density polyethylene resin ranging between about 2.5 to 25% by weight, said virgin high density polyethylene copolymer resin ranges between about 2.5-72.5% by weight, said container having environmental stress crack resistance which is maintained as contrasted to the loss of such environmental stress resistance that have been heretofore resulted from the use of post consumer resins.

2. The method set forth in claim 1 wherein said post consumer resin and linear low density copolymer resin are fusion blended before being mixed with the virgin high density polyethylene copolymer resin.

3. The method set forth in any one of claims 1 and 2 including a color concentrate wherein said linear low density copolymer resin is used as a carrier for said color concentrate in a fusion blend before being blended with said post consumer resin and said virgin high density copolymer resin.

4. A fusion blend comprising post consumer plastic of homopolymer high density polyethylene plastic and linear low density polyethylene resin such that the fusion blend can be mixed with virgin high density copolymer resin to form a plastic product, virgin high density polyethylene copolymer resin in said fusion blend, said virgin high density polyethylene copolymer resin having a density of at least about 0.94 gm/ml, a melt index of less than about 0.5 gm/10 min. and will have polymerized therein at least about 98 mole % ethylene with any comonomer polymerized therein being an alpha-monoolefin containing about 3-12 carbon atoms, said post consumer resin having a density of about 0.961 and a melt index of about 0.75, said linear low density polyethylene having a density in the range of about 0.91 to about 0.93 gm/ml, and a melt index of less than about 2.0 and having polymerized about 2-6 mole % of an alpha-monoolefin containing 3-12 carbon atoms with the balance of the monoolefin polymerized therein being ethylene, said post consumer resin ranging between about 25-95% by weight, said linear low density polyethylene resin ranging between about 2.5 to 25% by weight, said virgin high density polyethylene copolymer resin ranges between about 2.5-72.5% by weight.

5. The blend set forth in claim 4 wherein the blend includes a color concentrate, said linear low density resin being a carrier for said color concentrate before being blended with said post consumer resin.

* * * * *

UNITED STATES PATENT AND TRADEMARK OFFICE
CERTIFICATE OF CORRECTION

PATENT NO. : 5,783,637
DATED : July 21, 1998
INVENTOR(S) : James N. Herman and James E. Hiltner It is certified that error appears in the above-indentified patent and that said Letters Patent is hereby corrected as shown below:

On the title page, item [54], and column 1, lines 1-3:
The Title should read: "Plastic Container Made From a Fusion Blend of Post Consumer Plastic and Ethylene Polymers."

At column 1, line 23, "distance" should read --resistance--.

At TABLE III, column 5, line 19, "46$" should read --46%--.

Signed and Sealed this

Twenty-ninth Day of December, 1998

Attest:

BRUCE LEHMAN

Attesting Officer

Commissioner of Patents and Trademarks